(12) United States Patent
Hubbard et al.

(10) Patent No.: US 10,762,780 B2
(45) Date of Patent: Sep. 1, 2020

(54) IDENTIFICATION OF DRIVER ABNORMALITIES IN A TRAFFIC FLOW

(71) Applicant: SPEEDGAUGE, INC., San Francisco, CA (US)

(72) Inventors: Jonathan Hubbard, San Francisco, CA (US); Christopher A. Kantarjiev, Palo Alto, CA (US)

(73) Assignee: SPEEDGAUGE, INC., San Francisco, CA (US)

( * ) Notice: Subject to any disclaimer, the term of this patent is extended or adjusted under 35 U.S.C. 154(b) by 187 days.

(21) Appl. No.: 15/859,892

(22) Filed: Jan. 2, 2018

(65) Prior Publication Data

US 2018/0233041 A1    Aug. 16, 2018

Related U.S. Application Data

(63) Continuation of application No. 15/213,035, filed on Jul. 18, 2016, now Pat. No. 9,858,814, which is a
(Continued)

(51) Int. Cl.
*G08G 1/09* (2006.01)
*G01S 19/14* (2010.01)
(Continued)

(52) U.S. Cl.
CPC ........ *G08G 1/096741* (2013.01); *G01S 19/14* (2013.01); *G06Q 10/06398* (2013.01);
(Continued)

(58) Field of Classification Search
CPC ........... G08G 1/096741; G08G 1/0112; G08G 1/0133; G08G 1/0141; G08G 1/096716;
(Continued)

(56) References Cited

U.S. PATENT DOCUMENTS 9,147,353 B1    9/2015  Sulsar
9,396,660 B2    7/2016  Hubbard
(Continued)

FOREIGN PATENT DOCUMENTS

CA        2809689         9/2014
KR    20050103662 A  *  11/2005

OTHER PUBLICATIONS

Aleyadeh, Sam; "Road and Driver Monitoring System". Queen's University, Kingston, Ontario, Canada. Sep. 2014.
(Continued)

*Primary Examiner* — Rodney A Butler
(74) *Attorney, Agent, or Firm* — Polsinelli LLP

(57) ABSTRACT

Driving behavior may be analyzed based on other vehicles in proximity to a tracked or monitored vehicle. GPS data is collected from the monitored vehicle and other vehicles in physical or geographic proximity thereto. A determination is made as to whether the vehicle in the physical or geographical area is exhibiting aberrant behavior. The aberrant behavior may be determined in view of other vehicles in the geographical area. If aberrant behavior is detected, an alert may be generated and transmitted to an administrator.

20 Claims, 6 Drawing Sheets

Related U.S. Application Data continuation of application No. 14/602,197, filed on Jan. 21, 2015, now Pat. No. 9,396,660.

(60) Provisional application No. 61/929,958, filed on Jan. 21, 2014.

(51) Int. Cl.

| | | |
|---|---|---|
| *G06Q 10/06* | (2012.01) | |
| *G06Q 10/10* | (2012.01) | |
| *G08G 1/01* | (2006.01) | |
| *G08G 1/0967* | (2006.01) | |
| *G08G 1/00* | (2006.01) | |
| *G06Q 50/30* | (2012.01) | |

(52) U.S. Cl.
CPC ............ *G06Q 10/10* (2013.01); *G08G 1/0112* (2013.01); *G08G 1/0133* (2013.01); *G08G 1/0141* (2013.01); *G08G 1/096716* (2013.01); *G08G 1/096775* (2013.01); *G08G 1/20* (2013.01); *G06Q 50/30* (2013.01)

(58) Field of Classification Search
CPC ............ G08G 1/096775; G08G 1/20; G06Q 10/06398; G06Q 10/10; G06Q 50/30; G01S 19/14
See application file for complete search history.

(56) References Cited

U.S. PATENT DOCUMENTS

| | | | |
|---|---|---|---|
| 9,620,029 B2 | 4/2017 | Lawrenson et al. | |
| 9,858,814 B2 | 1/2018 | Hubbard | |
| 2008/0255722 A1* | 10/2008 | McClellan | B60R 25/102 701/31.4 |
| 2009/0299857 A1 | 12/2009 | Brubaker | |
| 2009/0306834 A1 | 12/2009 | Hjelm et al. | |
| 2009/0322558 A1* | 12/2009 | Videtich | H04W 4/21 340/870.07 |
| 2010/0332266 A1 | 12/2010 | Tamir et al. | |
| 2011/0130916 A1 | 6/2011 | Mayer | |
| 2012/0062392 A1* | 3/2012 | Ferrick | G08G 1/096716 340/905 |
| 2012/0066007 A1 | 3/2012 | Ferrick et al. | |
| 2013/0179027 A1 | 7/2013 | Mitchell | |
| 2013/0211660 A1 | 8/2013 | Mitchell | |
| 2013/0278441 A1 | 10/2013 | Rubin et al. | |
| 2013/0289846 A1 | 10/2013 | Mitchell et al. | |
| 2013/0321178 A1 | 12/2013 | Jameel et al. | |
| 2014/0099607 A1* | 4/2014 | Armitage | B60W 40/09 434/66 |
| 2014/0310192 A1 | 10/2014 | Boss et al. | |
| 2015/0081399 A1 | 3/2015 | Mitchell et al. | |
| 2015/0206436 A1 | 7/2015 | Hubbard | |
| 2017/0018180 A1 | 1/2017 | Hubbard | |

OTHER PUBLICATIONS

Sepulcre, Miguel et al., "Congestion and Awareness Control in Cooperative Vehicular Systems", Proceedings of the IEEE, vol. 99. No. 7, Jul. 2011.

Shan, Mao; "Probabilistic Long-Term Vehicle Motion Prediction and Tracking in Large Environments", Intelligent Transportation Systems, IEEE Transactions on (vol. 14, Issue: 2), pp. 539-552, Published: Nov. 15, 2012.

Rawashdeh, Zaydoun Y., Mahmud, Syed; "A novel algorithm to form stable clusters in vehicular ad hoc networks on highways", Digitialcommons-@Waynestate—Wayne State University Associated BioMed Central Scholarship, Jan. 15, 2012.

U.S. Appl. No. 14/602,197 Final Office Action dated Feb. 8, 2016.
U.S. Appl. No. 14/602,197 Office Action dated Sep. 10, 2015.
U.S. Appl. No. 14/602,197 Office Action dated May 12, 2017.

\* cited by examiner

IDENTIFICATION OF DRIVER ABNORMALITIES IN A TRAFFIC FLOW

CROSS-REFERENCE TO RELATED APPLICATIONS

The present application is a continuation and claims the priority benefit of U.S. patent application Ser. No. 15/213,035 filed Jul. 18, 2016, now U.S. Pat. No. 9,858,814, filed Jul. 18, 2016, which is a continuation and claims the priority benefit of U.S. patent application Ser. No. 14/602,197, now U.S. Pat. No. 9,396,660, filed Jan. 21, 2015, which claims the priority benefit of U.S. provisional application No. 61/929,958 filed Jan. 21, 2014, the disclosures of which are incorporated herein by reference.

BACKGROUND OF THE INVENTION

Field of the Invention

The present invention generally pertains to tracking the geographic location of vehicles in relation to other vehicles. More specifically, the present invention pertains to utilizing location based technologies to identify driver abnormalities in an ad hoc traffic flow.

Description of the Related Art

Positioning systems such as Global Positioning System (GPS) have many applications. One such application is determining the position of a vehicle. Some vehicles have GPS capabilities to assist the driver in making a determination as to their present location or how to arrive at a particular destination. Many drivers, too, may utilize a mobile device or smartphone with GPS capabilities to offer similar functionality.

Businesses that require use of one or more vehicles ("fleets") often have rules and preferences regarding how and where vehicles may be driven. Some fleet vehicles may be equipped with GPS components to allow for GPS tracking capability. But even with such capabilities, a fleet having only GPS monitoring will do nothing more but indicate to a fleet manager where a particular vehicle is at any given time. It is difficult to determine whether a vehicle operator is operating a vehicle or otherwise driving in a safe manner based solely on GPS generated information.

There is a need in the art for an improved methodology for monitoring the driving habits of the operators of fleet managed vehicles. There is a further need to determine whether these driving habit constitute safe operation thereby alleviating a fleet from potential liability or other costs associated with unsafe driving

SUMMARY OF THE PRESENTLY CLAIMED INVENTION

The present system may track vehicle behavior by first capturing position data for a plurality of vehicles. A metric associated with vehicle position may be determined for a subset of the plurality of vehicles within a geographical area. A vehicle of the plurality of vehicles may be identified which has a value for the metric that exceeds a threshold associated with the metric.

DETAILED DESCRIPTION

Driver behavior may be analyzed based on other vehicles in proximity to a monitored vehicle. GPS data is collected from a monitored vehicle and other vehicles in geographical or physical proximity to the monitored vehicle. Data may be received by way of positioning devices having GPS capability, including mobile devices. The collected GPS data may be received by an application server. The speed of vehicles within a geographical area may then be determined. The geographical area may be selected based on available data, input received by an administrator, the location of a particular vehicle, or in some other manner. A determination is made as to whether the vehicle in the geographical area is exhibiting aberrant behavior. The aberrant behavior may be determined in view of other vehicles in the geographical area.

For example, if a particular vehicle is traversing a road way at the speed limit but nevertheless traveling much faster than most other vehicles in the area, the behavior might be deemed aberrant. A vehicle may similarly be driving the speed limit but traveling too closely to other vehicles, thus providing an indicia of aberrant driving behavior. Other information related to otherwise driving in an unsafe manner may be derived from monitored vehicle data relative a larger sample of vehicles. In response to a determination of aberrant driving behavior, an alert may be generated and transmitted to an administrator, the driver of the vehicle, or provided to some other destination.

Figure 1:
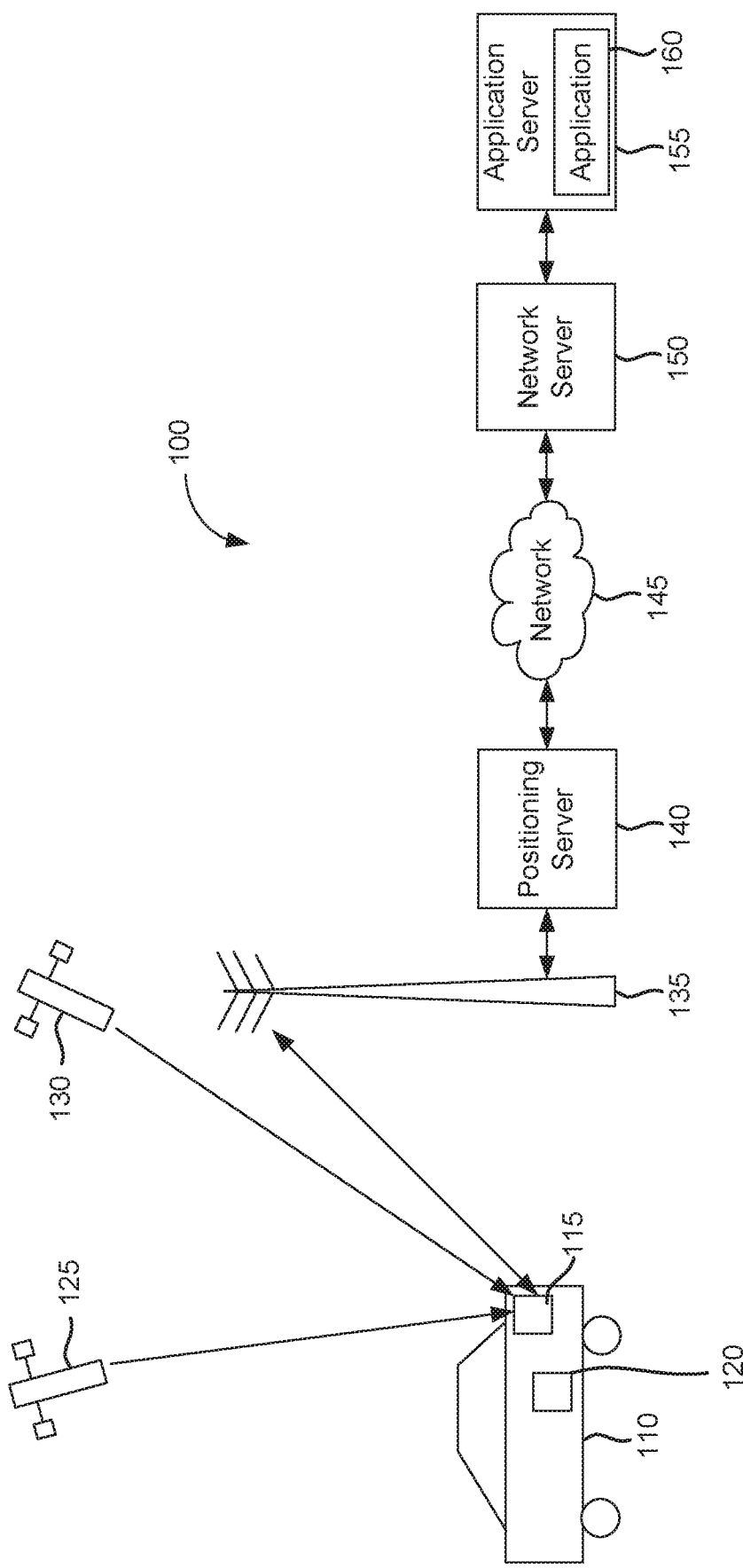
FIG. 1 illustrates a system for tracking a vehicle.

FIG. 1 illustrates a system 100 for tracking a vehicle. The system 100 of FIG. 1 includes vehicle 110, positioning device 115 (which may be representative of a GPS device), mobile device 120 (which may include GPS functionality), positioning satellites 125 and 130, communications tower 135, positioning server 140, network 145, network server 150, and application server 155. Application server 155 executes application 160, which is described in greater detail in the context of FIG. 2 below.

Vehicle 110 may travel on roads, highways, waterways, or other throughways. A road may include a public road, private road, highway, freeway, residential street, driveway, or other thoroughfare allowing for vehicle travel. The vehicle may be an automobile, shipping truck, motorized cycle, or some other vehicle.

The vehicle 110 may include a device 115 which communicates with satellite systems 125 and 130. Device 115 may further communicate with a wireless, data, or cellular communication system by way of the likes of communications tower 135. Positioning device 115 may receive signals from one or more positioning satellites 125 and 130 and determine its location based on the received signals. The positioning satellites may be part of a global, national or local positioning system. For example, the positioning satellites may be part of the Global Positioning System (GPS), and the positioning device may be a GPS device. As a GPS device, positioning device 115 may receive a signal from multiple GPS satellites, process the signals to determine a location for each satellite, and determine a location for itself (and therefore the vehicle).

Device 115 may communicate the positioning data in position coordinates (e.g., GPS coordinates), identification data and other data via a cellular communication network by use of communications tower 135, which may allow for cellular communications. Device 115 may further communicate via a wired connection, wireless connect (e.g., a radio frequency connection), or both. Other forms of data transmission by way of communications tower 135 are envisioned including wireless data such as 802.11 or similar wireless protocols.

Device 115 may be attached to vehicle 110, a device within vehicle 110 but associated with a user (e.g., a cellular phone), or other device capable of communicating over a cellular network. In this regard, vehicle 110—or the operator of vehicle 110—may utilize a mobile device 120 to provide certain location based information, including but not limited to GPS or base based positioning as might occur in conjunction with communication tower 135 or a series thereof. Mobile device 120 may be like that illustrated in the context of FIG. 6 and described in greater detail below.

Communications tower 135 may communicate the location information received for vehicle 110 to positioning server 140, which may be a GPS server. Though cellular networks and communication systems are discussed herein, other communication networks may be used to communicate the GPS and identity data to an application, such as but not limited to satellite communication technology.

Network server 150 may communicate with positioning server 140 through network 145 and with application server 155. Network server 150 may be implemented as one or more servers implementing a network service. The network server may receive positioning data, perform preliminary processing on the data, and provide the positioning data to application server 155. Positioning server 140, network server 150, and application server 155 may be implemented using the computing device discussed below with respect to FIG. 5.

Network 145 may facilitate communication of data between different servers, devices and machines, such as positioning server 140, network server 150, and application server 155. The network may be implemented, for example, as a private network, public network, intranet, the Internet, a wide area network, a local area network, or a combination of these networks.

Figure 5:
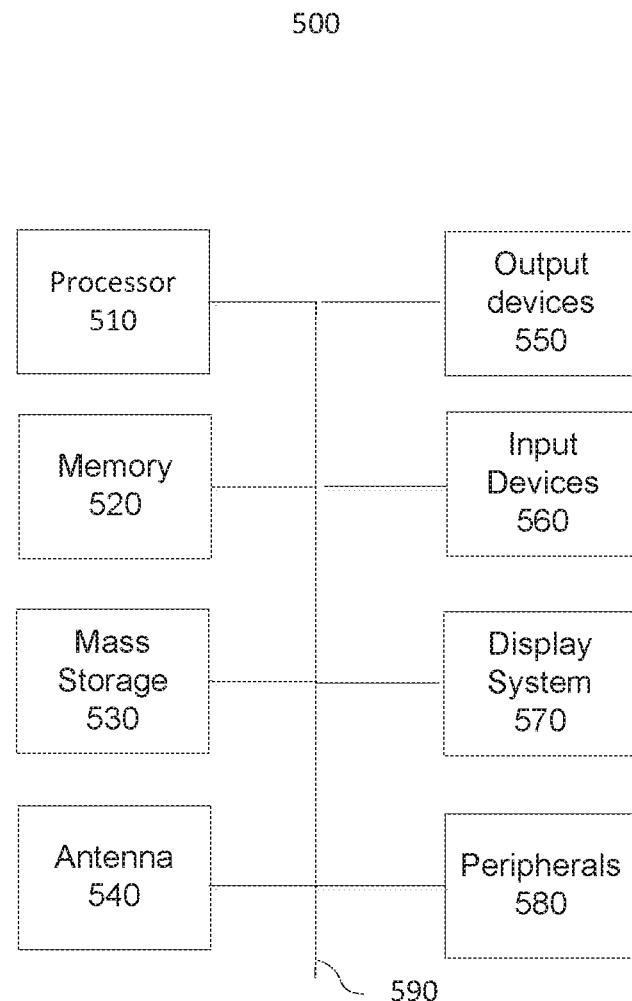
FIG. 5 illustrates an exemplar computing device 500 that may execute one or more embodiments of the invention as disclosed herein.

Application server 155 may be implemented as one or more servers like those in FIG. 5 and includes application 160. Application server 155 may communicate with network server 150 and other devices such as positioning device 115 or mobile device 120. Application 160 may receive positioning data associated with positioning device 115 or mobile device 120 and received from network server 150. Application 160 may then, in conjunction with application server 155, process the positioning data along with geo-data, and identify vehicle behavior related to other vehicles. A method for making such a determination is discussed in detail below with respect to FIG. 2.

Figure 2:
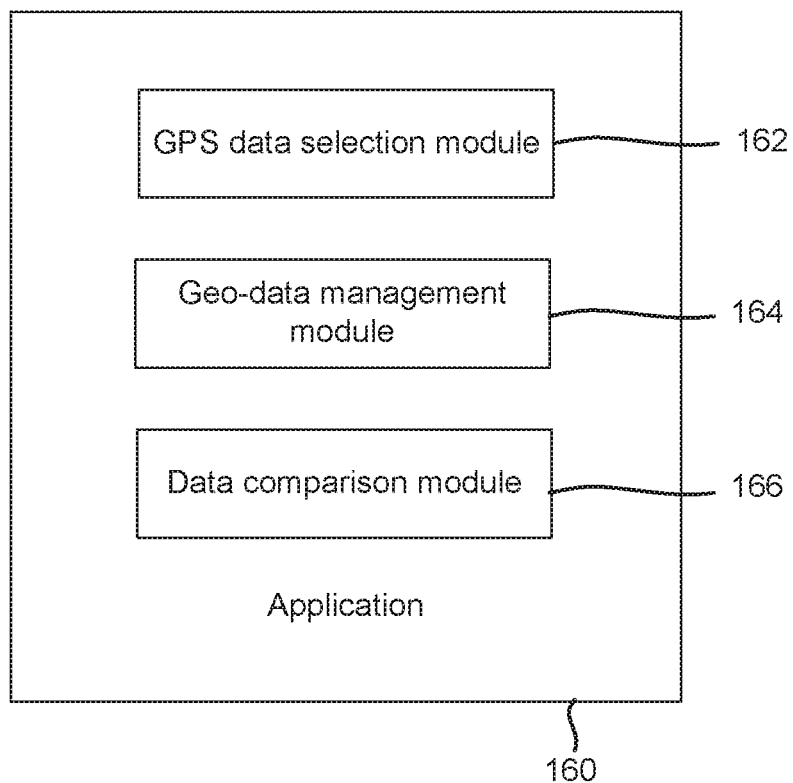
FIG. 2 illustrates an application for processing GPS data.
Figure 3:
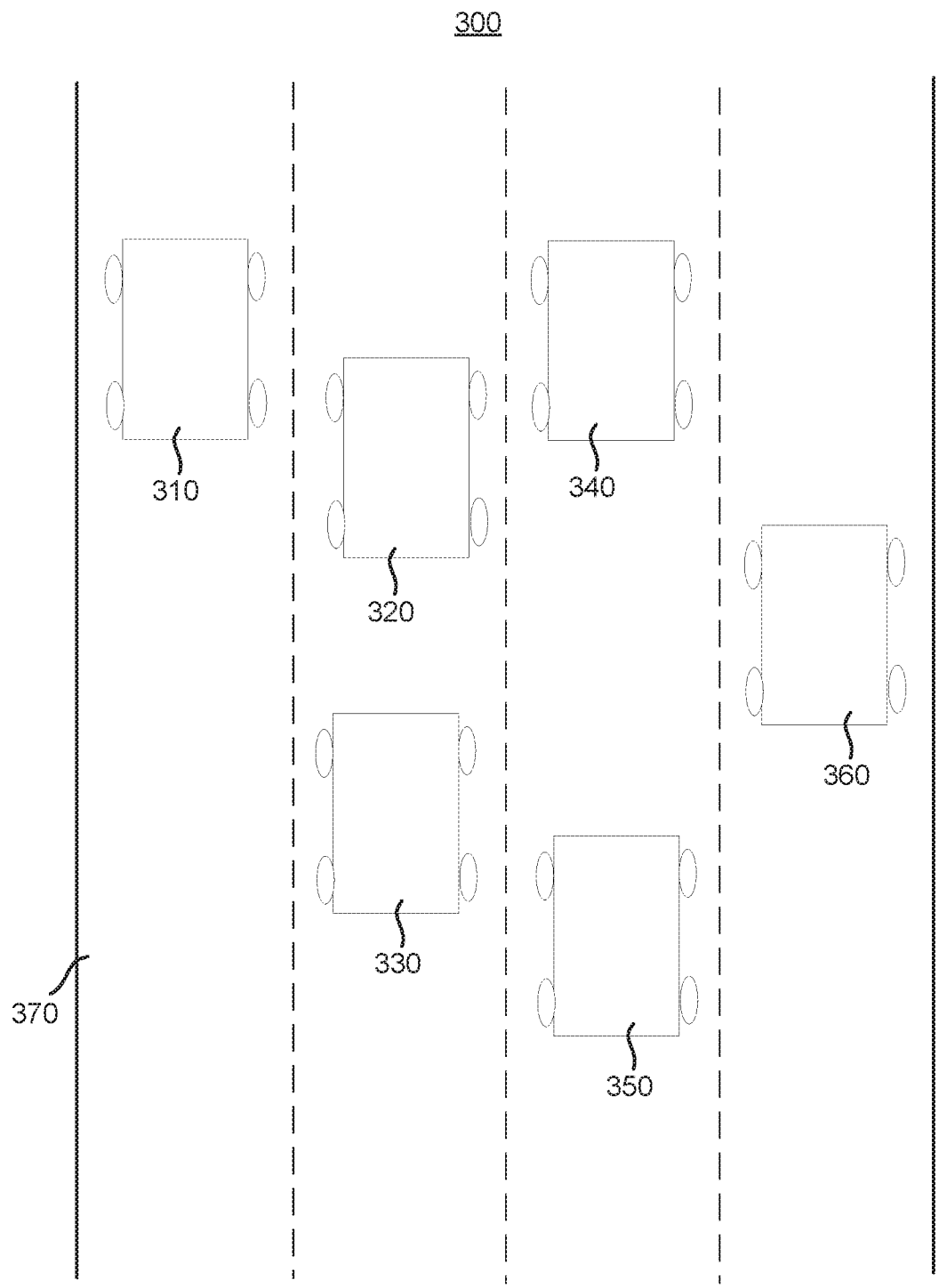
FIG. 3 illustrates a geographical area with a plurality of vehicles.
Figure 4:
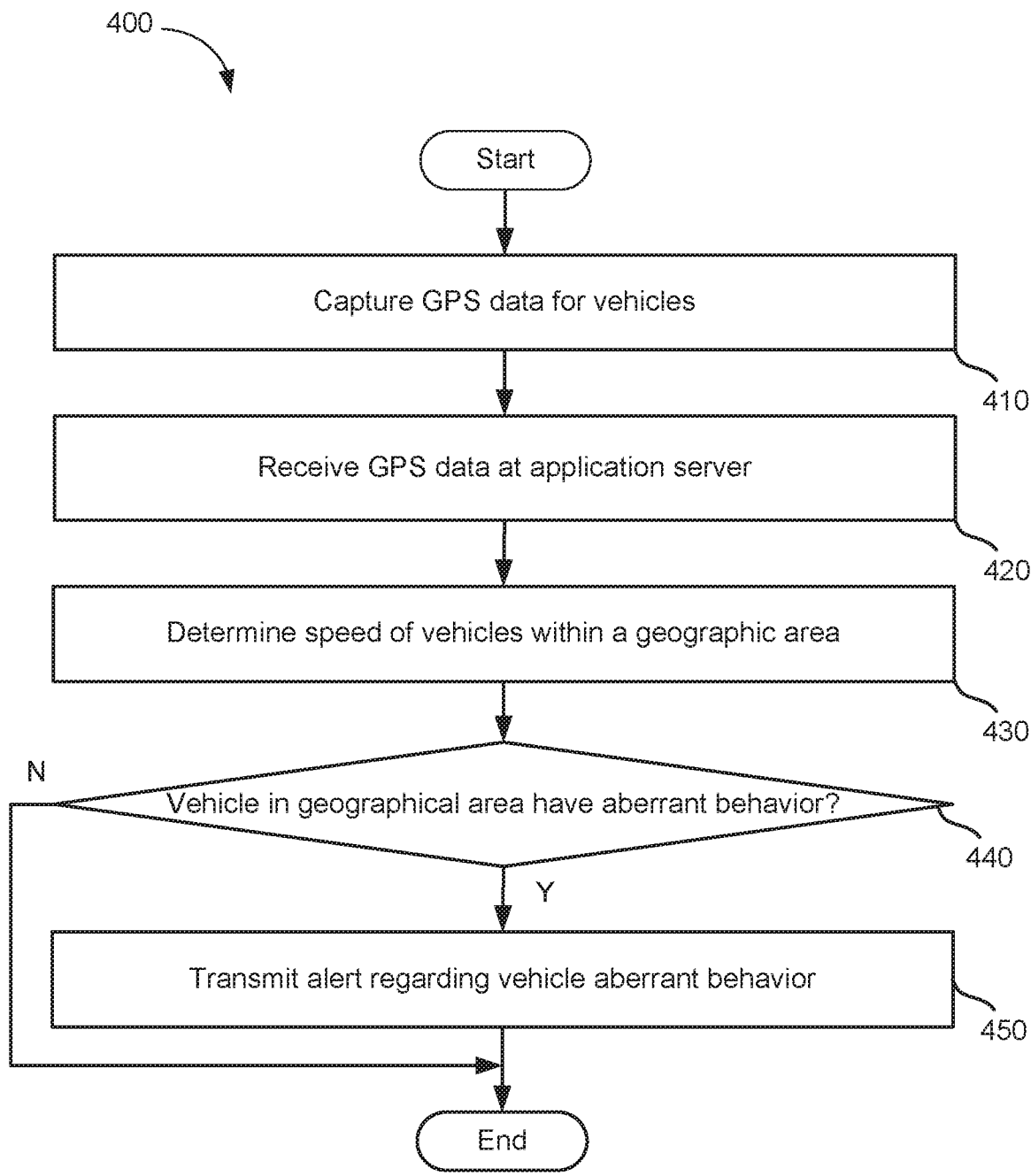
FIG. 4 illustrates a method for tracking a vehicle.

FIGS. 2-4 are discussed with reference to a GPS system. It is intended that the reference to a GPS system is for discussion purposes only, and that other positioning systems can be used with the present technology.

FIG. 2 illustrates an exemplary application for processing GPS data. The application of FIG. 2 may provide more detail for application 160 of FIG. 1. Application may operate on an application server 155 and like those discussed in the context of FIG. 5 below. Application 160 may include a GPS data selection module 162, geo-data management module 164, and data comparison module 166.

The GPS data selection module 162 is stored in memory and may be executed to receive GPS data from multiple vehicles via positional server 140, select a portion of the GPS data associated with a geographical area, and perform GPS data management functions.

Geo-Data Management Module 164 is stored in memory and may be executed to access and process geo-data for comparison and processing along with GPS data, as well as perform other data management functions for the geo-data.

Data Comparison Module 166 is stored in memory and may be executed to compare selected GPS data for multiple vehicles in a geographical area and provide output through an interface of Application Server 155.

It is intended that each of modules 162, 164, and 166 may be made of one or more modules whereby functionality may be combined to ultimately provide the functionalities of the invention as disclosed herein. The modules may be stored and executed on application server 155 or in some embodiments on a mobile device like that shown in FIG. 6. Various module functionalities may also be distributed over several computing devices (servers, mobile devices, and so forth).

FIG. 3 illustrates a geographical area 300 with a plurality of vehicles. The geographical area of FIG. 3 illustrates a highway 370 with vehicles 310-360. The vehicles may each have a device for tracking the vehicles location and speed such as positioning device 115 or mobile device 160. When data is collected for each of vehicles 310-360, metrics such as average speed, top speed, location, and so forth may be captured with each vehicle. If any of vehicles 310-360 have a metric not within an acceptable range of the other vehicles as determined by an application 160 executing at application server 155, an alert may be generated and transmitted regarding the out of range metric.

For example, an average speed and standard deviation may be determined for vehicles in a five mile portion of a highway. If a vehicle has exceeded twice the standard deviation, an alert may be generated and transmitted to an administrator. Further, a vehicle may in fact be driving a known speed limit for a portion of highway. That portion of highway may also be subject to extreme weather making it advisable to drive much slower that the posted speed limited. Using information obtained from a tracked vehicle (e.g., vehicle 340) and comparing it to all other vehicles in that same highway area (i.e., vehicles 310, 320, 330, 350, and 360) a determination or suggestion might be made that notwithstanding driving within the speed limit, that present driver behavior might be dangerous or hazardous relative other vehicles in that same area.

FIG. 4 illustrates a method 400 for tracking a vehicle. The method of FIG. 4 begins with capturing GPS Data for a plurality of vehicles at step 410. GPS data may be captured using one or more positional devices 115 and/or mobile devices 120 on each vehicle 110 as might be traveling in a given area like that of FIG. 3. The GPS data may be captured for one each of several vehicles, for example for a fleet of vehicles. Capturing the data may include receiving satellite signals at positioning device 115 or mobile device 120, determining a location for the positioning device 115 or mobile device 120 from the signals, and transmitting location information by a cellular communication system or some other communications network to positioning server 140.

The GPS data may be received at the application server at step 420. The GPS data captured from vehicle 110 may be received by application server 155 via network 145 and network server 150. In addition to the GPS signal data, the GPS data transmitted from vehicle 110 to, ultimately, application 160 may also include the calculated location, heading and speed of positioning device 115. Vehicle identification information, positional device identification, and a time stamp for when the data was collected may also be transmitted as GPS data to application server 160.

The speed of each of a plurality of vehicles in a geographic area is determined at step 430. The speed of each vehicle may be determined by the GPS data associated with each vehicle. A metric associated with vehicle position may be determined for a subset of the plurality of vehicles within a geographical area. In some embodiments, the speed of each vehicle is provided directly to application 160 from positioning server 140. The geographic location may be selected by an administrator, based on data availability, based on a particular vehicle to be monitored, or other input.

Other determinations utilizing GPS data may also be made. For example, GPS data can provide information related to how closely one vehicle may be relative other tracked vehicles; lane change information (i.e., weaving in and out of traffic), braking information, hard stop information, as well as traditional speeding information.

A determination is made as to whether a vehicle in the geographical area has aberrant behavior at step 440. The aberrant behavior may include behavior measurable by a metric and having a value above a certain threshold. The threshold may be associated with a metric and determined from the value of the metric for each of the other vehicles in the geographical area. For example, the aberrant behavior in speed may include a speed of above (or below) twice the standard deviation from the average speed of vehicles in the geographical area. If no vehicle in the geographical area is associated with aberrant behavior, the method of FIG. 4 ends.

If a vehicle is associated with aberrant behavior, an alert is generated and transmitted to an administrator at step 450. The alert may indicate the vehicle identifier, driver, speed or other metric associated with aberrant behavior, time stamp, location, and other data. As noted above, various types of driving behavior may be derived from GPS data and not merely speed. As such, other determinations may be made as to aberrant behavior such as weaving, hard braking, or following other vehicles too closely.

FIG. 5 illustrates an exemplar computing device 500 that may execute one or more embodiments of the invention as disclosed herein. Computing device 500 of FIG. 1 may be implemented in the contexts of clients and servers, for example. The computing device 500 of FIG. 5 includes one or more processors 510 and memory 520. Memory 520 may store instructions and data such as executable code for execution by processor 510. The computing device 500 of FIG. 5 also includes mass storage 530, antenna 540, output devices 550, user input devices 560, a display system 570, and peripheral devices 580.

The components shown in FIG. 5 are depicted as being connected via a single bus 590. The components may, however, be connected through one or more data transport means and not just a singular bus. For example, processor unit 510 and main memory 520 may be connected via a local microprocessor bus while storage 530, peripheral device(s) 580, and display system 570 may be connected via one or more input/output (I/O) buses.

Mass storage device 530 may include resident mass storage or remote storage as might be accessed over a network connection. Mass storage may be implemented with a magnetic disk drive, an optical disk drive, FLASH memory, or a portable USB data storage device. Mass storage may also be storage arrays maintained remote from various operating aspects of the device 500. Mass storage device 530 can store the system software for implementing embodiments of the present invention by loading that software into main memory 520.

Antenna 540 may include one or more antennas for wirelessly communicating with another device. Antenna 540 may be used, for example, to wirelessly communicate wirelessly via Wi-Fi or an 802.x protocol, Bluetooth, by way of a cellular network, or with other wireless protocols and systems. The one or more antennas may be controlled by a processor that includes a controller to manage the transmission and receipt of wireless signals.

The device 500 as shown in FIG. 5 includes output devices 550 and input devices 560. Examples of output devices include speakers, printers, and monitors. Input devices 560 may include a microphone, accelerometers, a camera, and other devices. Input devices 160 may also include an alpha-numeric keypad, such as a keyboard, for inputting alpha-numeric and other information, or a pointing device, such as a mouse, a trackball, stylus, or cursor direction keys. Network interfaces may be integrated into output device 550 or input device 560 or some combination of the same. Network interfaces may be used to allow for access to a communications network (wired or wireless) including but not limited to Ethernet or 802.11, which may further utilize the aforementioned antenna system 540.

Display system 570 may include a liquid crystal display (LCD), LED display, or a plasma display. Display system 570 receives textual and graphical information as processed by device 500 to allow for visual depiction of the same. Peripherals 580 in turn may include any type of computer support device to add additional functionality to the device 500 of FIG. 5. For example, peripheral device(s) 580 might include a modem or a router.

The components illustrated in the computing device 500 of FIG. 5 may be found in the context of a desktop computer, a laptop computer, a netbook computer, a tablet computer, a smart phone, a personal data assistant (PDA), a server, or some other computing device that may be suitable for implementing one or more embodiments of the present invention. The computer system 500 of FIG. 5 is therefore intended to include different bus configurations, network platforms, multi-processor platforms, and operating systems including but not limited to Unix, Linux, Windows, Macintosh OS, Palm OS, Android OS, and Apple iOS.

Figure 6:
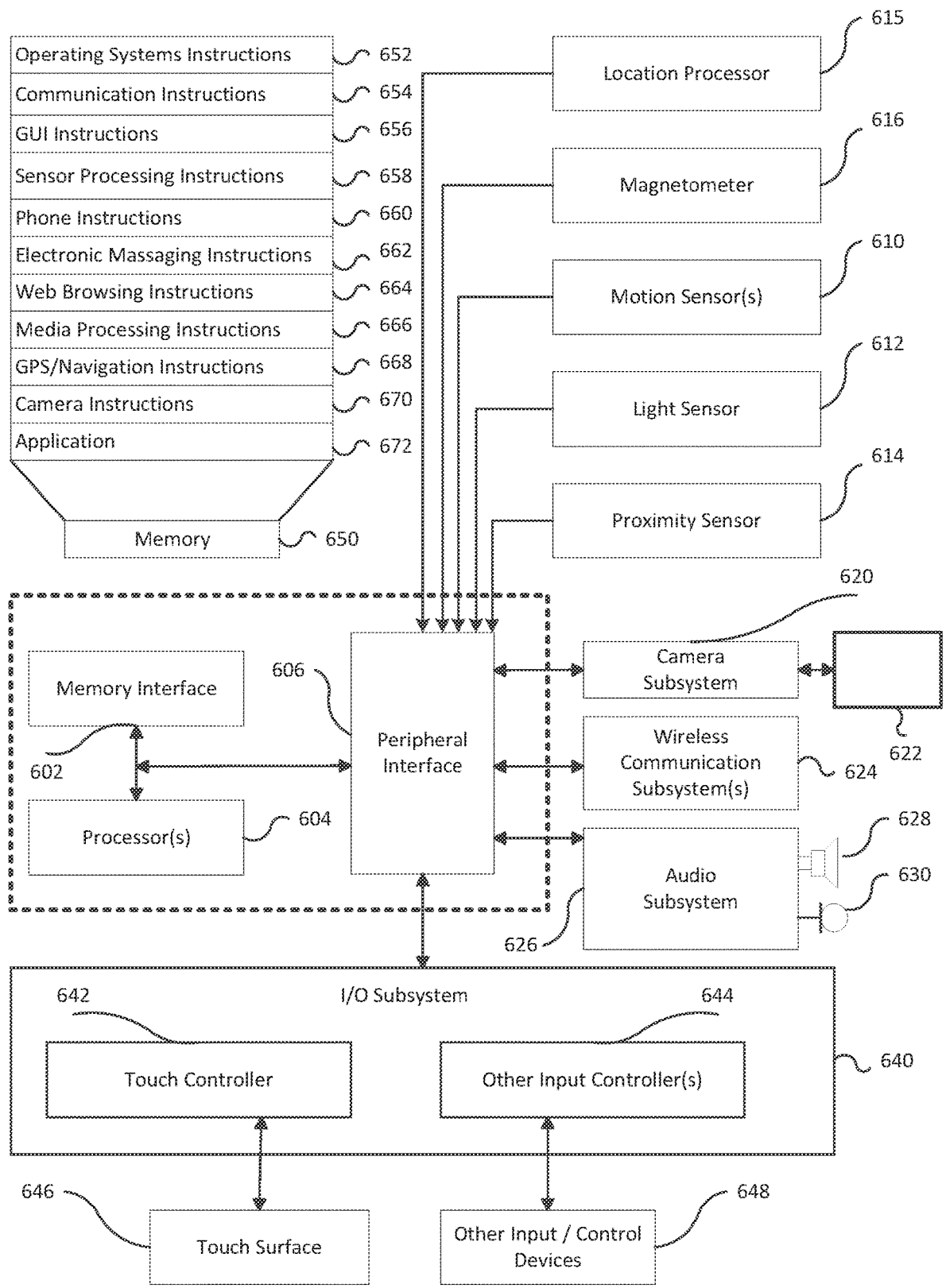
FIG. 6 is a block diagram of an exemplar mobile device 600 that may execute one or more embodiments of the invention as disclosed herein.

FIG. 6 is a block diagram of an exemplar mobile device 600 that may execute one or more embodiments of the invention as disclosed herein. The computing device 600 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the computing device 600 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), a temperature sensor, a biometric sensor, or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing device 600 is intended to operate. For example, the computing device 600 can include communication subsystems 624 designed to operate over a GSM network, a GPRS network, an EDGE network, a Wi-Fi or WiMax network, and a Bluetooth™ network. In particular, the wireless communication subsystems 624 can include hosting protocols such that the device can be configured as a base station for other wireless devices.

An audio subsystem 626 can be coupled to a speaker 628 and a microphone 630 to facilitate voice-enabled functions, such as speaker recognition, voice replication, digital recording, and telephony functions. The audio subsystem 626 can be configured to facilitate processing voice commands, voice printing and voice authentication.

The I/O subsystem 640 can include a touch-surface controller 642 and/or other input controller(s) 644. The touch-surface controller 642 can be coupled to a touch surface 646. The touch surface 646 and touch-surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the touch surface 646; and a pressing of the button for a second duration that is longer than the first duration can turn power to the computing device 600 on or off. Pressing the button for a third duration can activate a voice control, or voice command, module that enables the user to speak commands into the microphone 630 to cause the device to execute the spoken command. The user can customize a functionality of one or more of the buttons. The touch surface 646 can, for example, also be used to implement virtual or soft buttons and/or a keyboard.

In some implementations, the computing device 600 can present recorded audio and/or video files, such as MP3, AAC, and MPEG files. In some implementations, the computing device 600 can include the functionality of an MP3 player, such as an iPod™ The computing device 600 can, therefore, include a 36-pin connector that is compatible with other devices like an iPod. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). In some implementations, the operating system 652 can include instructions for performing voice authentication. For example, operating system 652 can implement one or more of the features described above.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can store other software instructions 672 to facilitate other processes and functions as described above.

The memory 650 can also store other software instructions (not shown. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) 674 or similar hardware identifier can also be stored in memory 650.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing device 600 can be implemented in hardware and/or in software, including in one or more signal processing and/or application specific integrated circuits.

Embodiments of the invention may be implemented on any computing device, including mobile devices such as Apple iPhones, Android phones, or any mobile electronic device with a touch screen. In the preferred embodiment of the invention, the selection boxes depicted in the figures are displayed on a touch screen. In certain instances one or more of the selection boxes may be a physical button on the client device The foregoing detailed description has been presented for purposes of illustration and description. It is not intended to be exhaustive or limiting unless expressly stated to the contrary. Modifications and variations are possible in light of the above teachings that otherwise best explain the principles of the present invention and its practical application. The scope of the present invention is otherwise intended to be limited only by the claims appended hereto.

What is claimed is:

1. A system for alerts based on abnormal vehicle behavior, the system comprising:
a network data transceiver that:
receives a location of a first vehicle from a first vehicle wireless data transceiver associated with the first vehicle, the location of the first vehicle generated by a positioning receiver in response to receipt of one or more wireless positioning signals by the positioning receiver, wherein the location of the first vehicle indicates that the first vehicle is traversing a road within an area specified by a vehicle position metric,
receives nearby vehicle information indicative of behavior of a plurality of nearby vehicles other than the first vehicle, wherein the plurality of nearby vehicles are within the area specified by the vehicle position metric while the first vehicle is traversing the road within the area, and
transmits an alert;
a memory that stores instructions; and
a processor coupled to the memory, wherein execution of the instructions stored by the processor causes the processor to:
generate the alert, the alert indicating that a metric characterizing behavior of the first vehicle falls outside of an acceptable range, wherein the acceptable range is based on a standard deviation of the nearby vehicle information.

2. The system of claim 1, wherein the network data transceiver transmits the alert to the first vehicle wireless data transceiver associated with the first vehicle.

3. The system of claim 1, wherein the network data transceiver transmits the alert to a device that is associated with a fleet manager for a fleet of vehicles that includes the first vehicle.

4. The system of claim 1, wherein the network data transceiver transmits the alert to a cellular phone.

5. The system of claim 1, wherein the network data transceiver also receives an image of an operator of the first vehicle, the image captured by a camera associated with the first vehicle.

6. A method for alerts based on abnormal vehicle behavior, the method comprising:
receiving a location of a first vehicle from a first vehicle wireless data transceiver associated with the first vehicle, the location of the first vehicle generated by a positioning receiver in response to receipt of one or more wireless positioning signals by the positioning receiver, wherein the location of the first vehicle indicates that the first vehicle is traversing a road within a specified area;
receiving nearby vehicle information indicative of behavior of a plurality of nearby vehicles other than the first vehicle, wherein the plurality of nearby vehicles are within the specified area while the first vehicle is traversing the road within the area;
executing instructions stored in memory via a processor, wherein execution of the instructions by the processor causes the processor to generate an alert indicating that a metric characterizing behavior of the first vehicle falls outside of an acceptable range, wherein the acceptable range is based on a standard deviation of the nearby vehicle information; and
transmitting the alert.

7. The method of claim 6, wherein the metric characterizing behavior of the first vehicle is an average speed.

8. The method of claim 6, wherein the metric characterizing behavior of the first vehicle is a top speed.

9. The method of claim 6, wherein the metric characterizing behavior of the first vehicle is the location of the first vehicle.

10. The method of claim 6, wherein the metric characterizing behavior of the first vehicle indicates weaving by the first vehicle.

11. The method of claim 6, wherein the metric characterizing behavior of the first vehicle indicates hard braking by the first vehicle.

12. The method of claim 6, wherein the metric characterizing behavior of the first vehicle indicates a distance between the first vehicle and a second vehicle.

13. The method of claim 6, wherein the metric characterizing behavior of the first vehicle indicates a lane change behavior.

14. A system for vehicle-based alerts, the system comprising:
a positioning receiver associated with a first vehicle, wherein the positioning receiver identifies one or more locations of the first vehicle based on one or more wireless signals received by the positioning receiver, wherein the one or more locations of the first vehicle indicate that the first vehicle is traversing a road within a specified area, the specified area associated with a vehicle position metric and nearby vehicle information;
a wireless data transceiver that transmits the one or more locations of the first vehicle to a server;
a memory that stores instructions; and
a processor coupled to the memory, wherein execution of the instructions stored by the processor causes the processor to:
identify a current speed of the first vehicle based on the one or more locations of the first vehicle,
identify that the current speed of the first vehicle is lower than a posted speed limit,
identify weather in the specified area, and
generate an alert indicating that it is advisable for the first vehicle to drive slower than the current speed based on the vehicle position metric, the nearby vehicle information, and the weather in the specified area; and
an output device that outputs the alert.

15. The system of claim 14, wherein the output device includes a display screen, and wherein the output device outputs the alert by displaying the alert via the display screen.

16. The system of claim 14, wherein the output device includes an audio output device, and wherein the output device outputs the alert by playing the alert via the audio output device.

17. The system of claim 14, wherein the output device includes the wireless data transceiver, and wherein the output device outputs the alert by transmitting the alert to a device associated with a fleet manager for a fleet of vehicles that includes the first vehicle.

18. The system of claim 14, wherein generating the alert indicating that it is advisable for the first vehicle to drive slower than the current speed is based on the weather in the specified area is further based on the current speed of the first vehicle falling outside of an acceptable range that is based on the nearby vehicle information indicative of behavior of a plurality of nearby vehicles other than the first vehicle, wherein the plurality of nearby vehicles are within the specified area associated with a vehicle position metric.

19. The system of claim 18, wherein the acceptable range is based on one or more standard deviations of the nearby vehicle information.

20. The system of claim 14, wherein the positioning receiver includes a Global Positioning System (GPS) receiver, and wherein the one or more wireless signals received by the positioning receiver are received from a GPS satellite.

* * * * *